US011188070B2

(12) United States Patent
Lavoie et al.

(10) Patent No.: US 11,188,070 B2
(45) Date of Patent: Nov. 30, 2021

(54) MITIGATING KEY FOB UNAVAILABILITY FOR REMOTE PARKING ASSIST SYSTEMS

(71) Applicant: Ford Global Technologies, LLC, Dearborn, MI (US)

(72) Inventors: Erick Michael Lavoie, Dearborn, MI (US); John Robert Van Wiemeersch, Novi, MI (US); Alyssa Chatten, Royal Oak, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 396 days.

(21) Appl. No.: 15/899,071

(22) Filed: Feb. 19, 2018

(65) Prior Publication Data
US 2019/0258238 A1    Aug. 22, 2019

(51) Int. Cl.
*G05D 1/00* (2006.01)
*H04W 4/02* (2018.01)
(Continued)

(52) U.S. Cl.
CPC ......... *G05D 1/0016* (2013.01); *B60R 25/245* (2013.01); *G05D 1/0022* (2013.01);
(Continued)

(58) Field of Classification Search
CPC .. G05D 1/0016; G05D 1/0033; G05D 1/0022; G05D 2201/0213; G05D 1/0236; G05D 1/0253; G05D 1/0255; G05D 1/0257; G05D 1/0259; G05D 1/0223; G05D 1/0285; G05D 2201/0211; G07C 9/00174; G07C 9/00309; G07C 2209/62; G07C 2009/00793; G07C 2209/63;
(Continued)

(56) References Cited

U.S. PATENT DOCUMENTS 5,959,724 A   9/1999  Izumi
6,275,754 B1  8/2001  Shimizu
(Continued)

FOREIGN PATENT DOCUMENTS

CN   101929921 A   12/2010
CN   103818204 A    5/2014
(Continued)

OTHER PUBLICATIONS

US 9,772,406 B2, 09/2017, Liu (withdrawn)
(Continued)

*Primary Examiner* — Jeffrey C Boomer
*Assistant Examiner* — Annmarie Irwin
(74) *Attorney, Agent, or Firm* — Frank Lollo; Eversheds Sutherland (US) LLP

(57) ABSTRACT

Method and apparatus are disclosed for mitigating key fob error for remote parking assist systems. An example vehicle includes wireless modules that communicatively couple to a key fob and a mobile device and a processor. The processor, when the key fob is usable, estimates a location of an operator based on the key fob, and operate an autonomous parking system in a first mode. Additionally, the processor, when the key fob is not usable, estimates the location of the operator based on the mobile device, and operate the autonomous parking system in a second mode.

16 Claims, 3 Drawing Sheets

(51) Int. Cl.
  *G07C 9/00*   (2020.01)
  *B60R 25/24*  (2013.01)
  *H04W 4/40*   (2018.01)
  *H04W 4/80*   (2018.01)
  *H04W 4/021*  (2018.01)
  *G05D 1/02*   (2020.01)

(52) U.S. Cl.
  CPC ....... *G05D 1/0033* (2013.01); *G07C 9/00174* (2013.01); *G07C 9/00309* (2013.01); *H04W 4/02* (2013.01); *G05D 1/0236* (2013.01); *G05D 1/0255* (2013.01); *G05D 1/0257* (2013.01); *G05D 1/0285* (2013.01); *G05D 2201/0213* (2013.01); *G07C 9/00896* (2013.01); *G07C 2009/00793* (2013.01); *G07C 2209/63* (2013.01); *H04W 4/022* (2013.01); *H04W 4/40* (2018.02); *H04W 4/80* (2018.02)

(58) Field of Classification Search
  CPC .... G07C 9/00896; H04W 4/02; H04W 4/022; H04W 4/80; H04W 4/40; B60R 25/00; B60R 25/245
  See application file for complete search history.

(56) References Cited

U.S. PATENT DOCUMENTS

| | | | |
|---|---|---|---|
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin et al. |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery et al. |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |

(56) References Cited

U.S. PATENT DOCUMENTS

| | | |
|---|---|---|
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar et al. |
| 2006/0010961 A1 | 1/2006 | Gibson |
| 2006/0227010 A1 | 10/2006 | Berstis |
| 2006/0235590 A1 | 10/2006 | Bolourchi |
| 2007/0200672 A1* | 8/2007 | McBride ............ B60R 25/245 340/5.72 |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096576 A1* | 4/2009 | Oman ................. G07C 5/008 340/5.62 |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0274013 A1* | 9/2014 | Santavicca ........ H04M 1/72412 455/418 |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0313009 A1* | 10/2014 | King ..................... G08C 17/02 340/5.61 |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161834 A1* | 6/2015 | Spahl ................ G07C 9/00309 340/5.61 |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |

(56) References Cited

U.S. PATENT DOCUMENTS

| | | |
|---|---|---|
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0061714 A1* | 3/2017 | Odejerte, Jr. ...... G07C 9/00309 |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0107207 A1* | 4/2018 | Kim ...................... B60W 30/06 |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2018/0370487 A1* | 12/2018 | Ishikawa ................. B60R 25/34 |
| 2019/0005445 A1 | 1/2019 | Bahrainwala |
| 2019/0042003 A1 | 2/2019 | Parazynski |
| 2019/0066503 A1 | 2/2019 | Li |
| 2019/0092317 A1* | 3/2019 | Bonander ............. B60W 30/06 |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102010034129 B4 | 11/2012 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102013004214 A1 | 5/2015 |
| DE | 102013019771 A1 | 5/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2295281 A1 | 3/2011 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |

(56) References Cited

FOREIGN PATENT DOCUMENTS

| | | |
|---|---|---|
| JP | 2004287884 A | 7/2014 |
| JP | 2005193742 A | 7/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2013/056959 A1 | 5/2015 |
| WO | WO 2013/123813 A1 | 12/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/096728 A1 | 7/2017 |
| WO | WO 2017/097942 A1 | 7/2017 |

OTHER PUBLICATIONS

Alberto Broggi and Elena Cardarelli, Vehicle Detection for Autonomous Parking Using a Soft-Cascade ADA Boost Classifier, Jun. 8, 2014.

Al-Sherbaz, Ali et al., Hybridisation of GNSS with other wireless/sensors technologies on board smartphones to offer seamless outdoors-indoors positioning for LBS applications, Apr. 2016, 3 pages.

Automatically Into the Parking Space—https://www.mercedes-benz.com/en/mercedes-benz/next/automation/automatically-into-the-parking-space/; Oct. 27, 2014.

Bill Howard, Bosch's View of the Future Car: Truly Keyless Entry, Haptic Feedback, Smart Parking, Cybersecurity, Jan. 9, 2017, 8 Pages.

ChargeItSpot Locations, Find a Phone Charging Station Near You, retrieved at https://chargeitspot.com/locations/on Nov. 28, 2017.

Core System Requirements Specification (SyRS), Jun. 30, 2011, Research and Innovative Technology Administration.

Daimler AG, Remote Parking Pilot, Mar. 2016 (3 Pages).

Jingbin Liu, IParking: An Intelligent Indoor Location-Based Smartphone Parking Service, Oct. 31, 2012, 15 pages.

Land Rover develops a smartphone remote control for its SUVs, James Vincent, Jun. 18, 2015.

Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.

Perpendicular Parking—https://prezi.com/toqmfyxriksl/perpendicular-parking/.

Safecharge, Secure Cell Phone Charging Stations & Lockers, retrieved at https://www.thesafecharge.com on Nov. 28, 2017.

Search Report dated Jan. 19, 2018 for GB Patent Application No. 1711988.4 (3 pages).

Search Report dated Jul. 11, 2017 for GB Patent Application No. 1700447.4 (3 Pages).

Search Report dated May 21, 2018 for Great Britain Patent Application No. GB 1800277.4 (5 Pages).

Search Report dated Nov. 22, 2018 for GB Patent Application No. GB 1809829.3 (6 pages).

Search Report dated Nov. 27, 2018 for GB Patent Application No. GB 1809112.4 (3 pages).

Search Report dated Nov. 28, 2017, for GB Patent Application No. GB 1710916.6 (4 Pages).

Search Report dated Nov. 28, 2018 for GB Patent Application No. GB 1809842.6 (5 pages).

Search Report dated Oct. 10, 2018 for GB Patent Application No. 1806499.8 (4 pages).

Tesla Model S Owner's Manual V2018.44. Oct. 29, 2018.

Vehicle's Orientation Measurement Method by Single-Camera Image Using Known-Shaped Planar Object, Nozomu Araki, Takao Sato, Yasuo Konishi and Hiroyuki Ishigaki, 2010.

* cited by examiner

MITIGATING KEY FOB UNAVAILABILITY FOR REMOTE PARKING ASSIST SYSTEMS

TECHNICAL FIELD

The present disclosure generally relates to a remote parking assist system of a vehicle and, more specifically, mitigating key fob error for remote parking assist systems.

BACKGROUND

A remote parking assist (RePA) system is designed to autonomously park a vehicle provided that the user's remote device is within a specified distance of the vehicle. The RePA system is intended to be used when the operator is outside the vehicle. The operator triggers the RePA system to park or un-park a vehicle into or out of a parking space using a remote device wirelessly communicating with the vehicle. Governments are developing regulations to require that control of RePA with the remote device shall only be allowed when the remote device is within a certain distance of the vehicle. For example, the proposed European regulation requires the remote device to be within 6 meters of the nearest point of the motor vehicle (see Economic Commission for Europe, Regulation No. 79) in order for the vehicle to autonomously park. As a result of these regulations, the operator may need to move as the vehicle moves when the path the vehicle is using to park moves the vehicle away from the operator. However, it can be difficult for the operator to judge the distance from the vehicle to know when their remote device is close enough to the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for mitigating key fob error for remote parking assist systems. An example vehicle includes wireless modules that communicatively couple to a key fob and a mobile device and a processor. The processor, when the key fob is usable, estimates a location of an operator based on a measurement of the location of the key fob, and operates an autonomous parking system in a first mode. Additionally, the processor, when the key fob is not usable or present, estimates the location of the operator based on the mobile device, and operates the autonomous parking system in a second mode.

An example method includes determining whether a key fob associated with an autonomous parking system is usable or present. The example method also includes when the key fob is usable, estimating a location of an operator based on first signal received from the key fob, and operating the autonomous parking system in a first mode. Additionally, the example method includes when the key fob is not usable, estimating the location of the operator based on a second signal received from a mobile device, and operating the autonomous parking system in a second mode.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
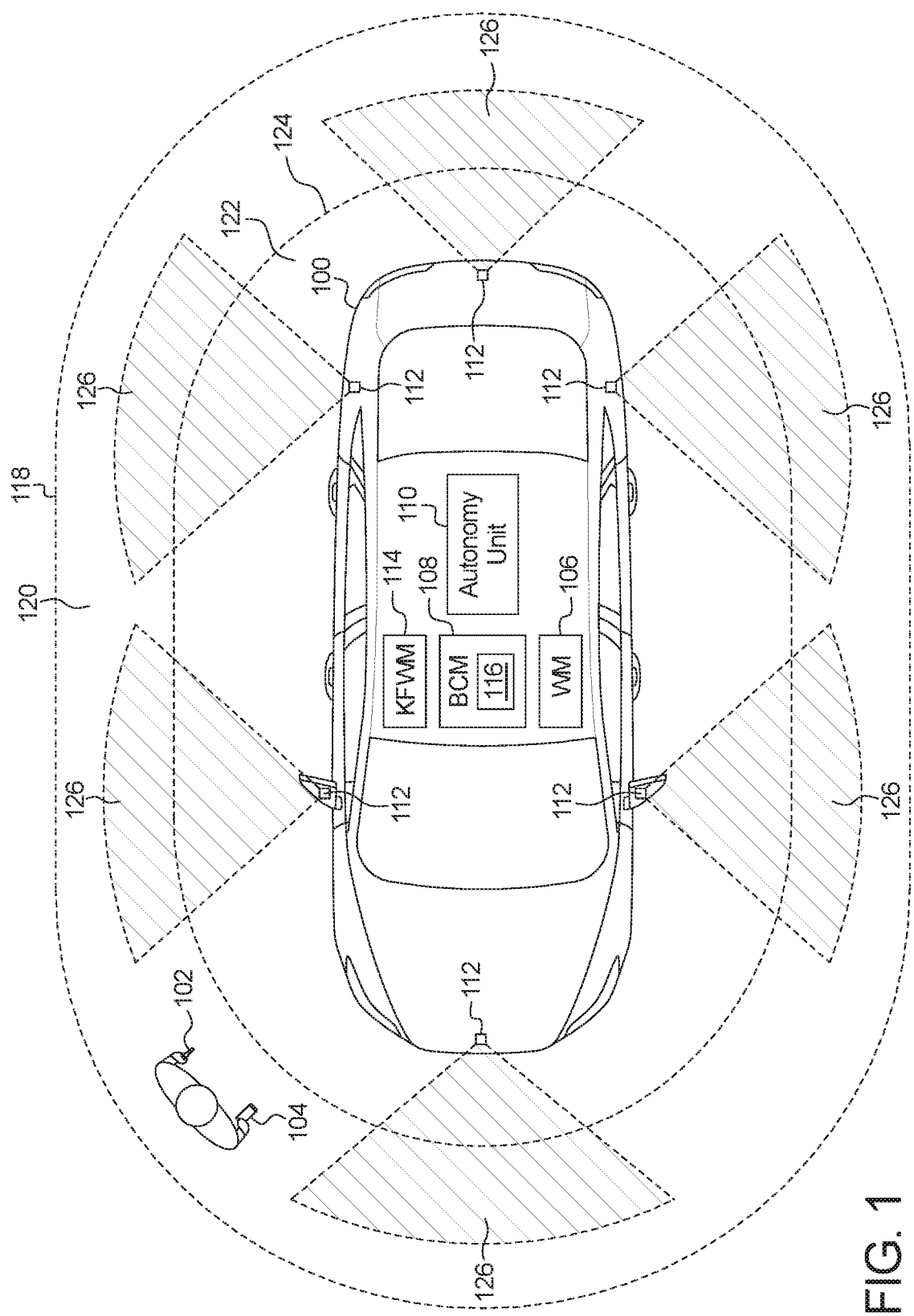
FIG. 1 illustrates a vehicle, a key fob, and a mobile device operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Remote park assist (RePA) systems are designed to autonomously park and un-park vehicles when the operator is outside the vehicle. For example, RePA systems may be used when a parking spot is too narrow for the operator to open the door, or passengers to open their doors, when the vehicle is parked. RePA systems use range detection sensors (e.g., ultrasonic sensors, radar, LiDAR, cameras, etc.) to sense the environment around the parking spot and plan and execute a path into and out of the parking spot. In some examples, the RePA system is activated by the operator and scans for an available parking space. When a parking space is detected, the RePA system signals, via an interface (e.g., a center console display, etc.) for the operator to stop the vehicle near the detected parking spot. The operator then exits the vehicle. RePA systems are then further activated via mobile devices (e.g., smartphone, smart watch, key fob, etc.) to complete the autonomous parking. In jurisdictions that require the mobile device to stay within a threshold distance of a vehicle, the RePA system tracks the location of the mobile device in relation to the location of the vehicle and determines whether the mobile device is within the threshold distance. When the mobile device is outside the threshold distance from the vehicle, the RePA system will not autonomously move the vehicle.

The RePA system of the vehicle tracks the location of the mobile device associated with the operator relative to the location of the vehicle. Generally, a key fob is used because the frequency of the signals used to communicate with the key fob can be more accurately localized than other mobile devices. The RePA system may use various techniques to determine the location of the mobile device relative to the location of the vehicle, such as dead reckoning and signal triangulation. In some examples, the RePA system just uses localization to track the location of the mobile device. Mobile device dead reckoning uses the inertial sensors (e.g., accelerometers, gyroscopes, etc.) in the mobile device to determine the current location of the mobile device based on a previous location (sometimes referred to as a "fix"). As the mobile device moves, the RePA system tracks the movement by tracking the distance and direction the mobile device has traveled relative to the initial location. To perform mobile device dead reckoning, the RePA system determines the initial location by establishing the location of the mobile device in relation to the location of the vehicle. However, establishing that relationship can be difficult. Additionally, dead reckoning is subject to cumulative error. Over time and distance, the error becomes large enough causing the location calculations to not be accurate enough for the RePA system. As a result, from time-to-time (e.g., after a threshold time, after a threshold distance, etc.), the RePA system reestablishes an initial location of the mobile device. For example, when an operator leaves the vehicle and goes shopping, to perform mobile device dead reckoning, the RePA system needs to reestablish the location of the mobile device relative to the location of the vehicle because of the cumulative error. One localization technique is to use the signal strength(s) of signals between the antenna of the mobile device and antenna(s) of the vehicle. By using a measurement of the strength of the signals (e.g., a received signal strength indicator (RSSI), a transmission strength (RX), a received channel power indicator (RCPI), etc.), the RePA system can estimate a location of the mobile device. The accuracy of the estimation depends on several factors, such as how many signal strength measurements from different vehicle antennas are being used, the frequency of the signal, the distance between the antenna of the mobile device and the antenna(s) of the vehicle, and interference of the environment around the vehicle, etc. In addition to mobile device dead reckoning, the RePA system performs vehicular dead reckoning. Since the vehicle moves during a RePA event, the system must estimate the real-time location of the vehicle to properly compare it with the estimated location of the mobile device. For example, even if the mobile device is stationary during the RePA event, the distance between the mobile device and vehicle will change as a result of the movement of the vehicle. Vehicular dead reckoning can be performed using the transducers already resident to typical vehicles, such as the steering wheel angle sensor and rotary encoders that are used for odometry. The vehicle can also perform dead reckoning using similar methods to mobile device dead reckoning (e.g. accelerometers, gyroscopes, etc.), but the vehicle-specific hardware is likely to produce more accurate results. As discussed below, the RePA system of the present disclosure uses dead reckoning and localization, singly and in combination, with various techniques to overcome the errors in the location determination methods and determine whether the mobile device is within a threshold distance of the vehicle.

As discussed below, the RePA system determines a status of a connection between a key fob and the vehicle. For example, the RePA system may determine that the key fob cannot be relied on for localization when a charge of a battery of the key fob is low, the RePA system cannot communicate with the key fob, and/or the localization of the key fob is erratic. Additionally, the RePA system is communicatively coupled to another mobile device, such as a smart phone or a smart watch. When the status of the connection between a key fob and the vehicle is indicative that the key fob is not reliable or available for localization, the RePA system sends instructions to the other mobile device to instruct the mobile device and/or the operator to take actions to mitigate the key fob failure.

In some examples, to mitigate the error, the RePA system instructs the mobile device to activate a wireless module (e.g., a Bluetooth® Low Energy (BLE) module, a wireless local area network (WLAN) module, etc.). In some such examples, the RePA system sends the instructions through a cellular data connection. For example, the RePA system may send the instructions via an external server to which an application executing on the mobile device is also connected. In some examples, the RePA system and the mobile device are communicatively coupled via one communication module (e.g., a BLE module operating at a 2.4 GHz frequency band) and instructs the mobile device to activate another wireless module (e.g., a WLAN module operating at a 5.0 GHz frequency band).

In some examples, when localizing using the mobile device instead of the key fob, the RePA system adjusts the boundary of an operational zone to compensate for the inherent error in localization using a mobile device. In some such examples, the RePA system reduces the threshold distance from the vehicle of the boundary. For example, localization using BLE may have an error of ±2 meters. In such an example, if the RePA system initially has the boundary of the operational zone at 6 meters, the RePA system may change the boundary to be at 4 meters from the vehicle. Alternatively, in some examples, the RePA system changes the locations of the operational zone to be proximate to the wireless modules on the vehicle being used to localize the mobile device. The boundary of the operation zone may not be equidistant to the vehicle. In some examples, the RePA system takes into account the shape of the vehicle, the antenna placement of the vehicle wireless modules, other sources of error detected by range detections sensors (e.g., radar, LiDAR, ultrasonic sensors, cameras, etc.), etc. when establishing the boundaries of the operational zone. Additionally, in some examples, the RePA system further reduces the size of the operational zone based on detecting a noisy signal environment (e.g., the positioning and number of objects in the field of view of the range detection sensors are indicative of a possible reduction in range or distortion of the signal strength indicator being used to localize the mobile device).

The RePA system provides an interface on the mobile device to inform the operator of the failure of the key fob and provide instructions to the operator on actions to take to mitigate the failure. In some examples, the RePA system, through the interface, instructs the user to activate a wireless module on the mobile device, such as the BLE module or the WLAN module. In some examples, the RePA system provides a visual depiction of the vehicle and the operational zone around the vehicle to inform the operator of locations to stand to enable autonomous parking. Additionally, in some examples, the interface provides visual, audio, and/or haptic feedback to assist the operator entering and staying in the reduced operation zone.

In some examples, the RePA system engages a limited operation mode when the key fob failure is detected. In some examples, in the limited operation mode, the RePA system (a) restricts the type of maneuvers that can be performed (e.g., only enable autonomously exiting a parking space, etc.) (b) limits a number of consecutive parking events (e.g., three autonomous parking events, etc.), (c) limit a durations in which the mobile device is usable instead of the key fob (e.g., one week, etc.), (d) limit a time of day or day of week in which the mobile device is usable instead of the key fob, (e) prevent use of the mobile device instead of the key fob after a threshold distance has been traveled by the vehicle, and/or (f) limit use of the autonomous parking features based on location. For example, the RePA system may restrict use of the autonomous parking features when the vehicle is in the operator's garage and/or when the location of the vehicle is greater than a threshold distance away from a location that may provide service to the key fob (e.g., a vehicle dealership, a repair shop, etc.). In some examples, the when the RePA system only enables autonomously exiting a parking space, the RePA system uses the range detection sensors to determine when (a) the driver's door is fully able to be open, (b) all of the doors are able to be open, or (c) the trunk is able to be opened while standing behind the vehicle. In such examples, when the condition is met, the RePA system stops autonomously unparking the vehicle.

FIG. 1 illustrates a vehicle 100, a key fob 102, and a mobile device 104 operating in accordance with the teachings of this disclosure. The vehicle 100 may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 is a semi-autonomous vehicle (e.g., some routine motive functions, such as parking, are controlled by the vehicle 100), or an autonomous vehicle (e.g., motive functions are controlled by the vehicle 100 without direct driver input). In the illustrated example, the vehicle 100 includes a wireless module 106, a body control module (BCM) 108, and an autonomy unit 110.

The wireless module 106 includes wired or wireless network interfaces to enable communication with external networks. In some such examples, the wireless module 106 includes hardware (e.g., processors, memory, storage, antenna, etc.) and software that communicates via cellular networks (Global System for Mobile Communications (GSM), Universal Mobile Telecommunications System (UMTS), Long Term Evolution (LTE), Code Division Multiple Access (CDMA), etc.), wireless local area networks (WLAN) (including IEEE 802.11a/b/g/n/ac or others, dedicated short range communication (DSRC), visible light communication (Li-Fi), etc.), and/or wide area networks (Wireless Gigabit (IEEE 802.11ad), etc.). In some examples, the vehicle 100 may communicate with a server via the external network. The external network(s) may be a public network, such as the Internet; a private network, such as an intranet; or combinations thereof, and may utilize a variety of networking protocols now available or later developed including, but not limited to, TCP/IP-based networking protocols.

The wireless module 106 is communicatively coupled (e.g., wired or wirelessly) to wireless nodes 112 located at various locations of the vehicle 100. Using the wireless nodes 112, the wireless module 106 performs localization techniques (e.g., triangulation/trilateration, and/or dead reckoning, etc.) based on signal strength values (e.g., a received signal strength indicator (RSSI), a transmission strength (RX), a received channel power indicator (RCPI), etc.) received from the wireless nodes 112 to determine the location of the mobile device 104 relative to the location of the vehicle 100. The wireless module 106 provides this localization data to other electronic control modules in the vehicle 100, such as the body control module 108 and the autonomy unit 110.

In the illustrated example, each of the wireless nodes 112 is configured to communicatively couple to the mobile device 104. Each of the wireless nodes 112 includes hardware and firmware to establish a wireless connection with the mobile device 104. In some examples, the wireless nodes 112 are wireless personal area network (WPAN) modules that wirelessly communicate with the mobile device 104 via short-range wireless communication protocol(s). In some examples, the wireless nodes 112 implement the Bluetooth® and/or Bluetooth® Low Energy (BLE®) protocols. The Bluetooth® and BLE® protocols are set forth in Volume 6 of the Bluetooth® Specification 4.0 (and subsequent revisions) maintained by the Bluetooth® Special Interest Group. Additionally or alternatively, in some examples, the wireless nodes 112 are configured to wirelessly communicate via a local wireless communication protocol (e.g., IEEE 802.11a/b/g/n/ac/p).

Some of the wireless nodes 112 are exterior nodes. The exterior nodes are positioned and oriented to communicatively couple to and/or monitor communication of the mobile device 104 when the mobile device 104 is located outside of and/or within the cabin of the vehicle 100. For example, each of the external wireless nodes 112 is located near an exterior of the vehicle 100 and oriented in a direction away from the cabin to communicatively couple to the mobile device 104 when the mobile device 104 is outside of the cabin of the vehicle 100. Some of the wireless nodes 112 are interior nodes. The internal wireless nodes 112 are positioned and oriented to communicatively couple to and/or monitor communication of the mobile device 104 when the mobile device 104 is located within and/or outside of the cabin of the vehicle 100. For example, the one of the internal wireless nodes 112 may be located near and oriented toward a front portion of the cabin to communicatively couple to and/or monitor communication of the mobile device 104 when the mobile device 104 is located within the front portion of the cabin. Further, one of the internal wireless nodes 112 may be located near and oriented toward a rear portion of the cabin to communicatively couple to and/or monitor communication of the mobile device 104 when the mobile device 104 is located within the rear portion of the cabin.

The body control module 108 controls various subsystems of the vehicle 100. For example, the body control module 108 may control power windows, power locks, an immobilizer system, and/or power mirrors, etc. The body control module 108 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. The body control module 108 is communicatively coupled to a key fob wireless module (KFWM) 114 (sometimes referred to as a "remote keyless entry (RKE)" module).

The key fob wireless module 114 receives signals from the key fob 102 to control functions (e.g., door lock/unlock, alarm, trunk access, etc.) of the vehicle 100. The key fob wireless module 114 sends polling signals requesting the key fob 102 (a) measure the polling signal strength between the vehicle 100 and the key fob 102 and (b) report back the polling signal strength to the key fob wireless module 114. The key fob wireless module 114 uses the signal strength measurement to estimate (e.g., using trilateration, etc.) the distance from the key fob 102 to each polling antenna from which key fob wireless module 114. In some examples, the key fob wireless module 114 provides the polling signal strength measurements to the body control modules 108 to calculate the distance of the key fob from the vehicle 100.

The key fob 102 also sends a battery status indicator that represents a state of charge of the battery of the key fob 102. In some examples, the battery status indicator is a binary value that indicates whether the charge of the battery is above or below a threshold. In some examples, the battery status indicator includes more granular charge status information, such as having 100%, 75%, 50%, or 25% charge. In some examples, the battery status indicator includes that charge (e.g., in volts) of the battery. The key fob wireless module 114 determines a status of the key fob 102. In some examples, the status of the key fob is negative when (a) the battery of the key fob is below a threshold, (b) the key fob wireless module 114 does not receive a response to a polling signal within a threshold period of time, and/or (c) the signal from the key fob 102 is not reliable. For example, the signal from the key fob 102 may not be reliable when a response is not received for a threshold percentage of polling signals.

In some examples, the key fob wireless module 114 receives responses to polling signals from multiple key fobs associated with the vehicle 100. In such examples, the key fob wireless module 114 indicates a negative status when all of the key fobs have a negative status. For example, when three key fobs response to the polling signal, the key fob wireless module 114 may not indicate a negative status if at least one of the multiple key fobs does not meet the negative status criteria discussed above. When one or more of the multiple key fobs meet the negative status criteria, the key fob wireless module 114 ignore those key fobs (e.g., does not localize using those key fobs, does not accept commands from those key fobs, etc.). In some examples, the key fob wireless module 114 sends a message that causes an audio and/or visual alert to the ones of the multiple key fobs that do not meet the negative status criteria and uses the one of the multiple key fobs that is the first to send a command back to the key fob wireless module 114. For example, if the key fob wireless module 114 receives polling responses from two key fobs associated with the vehicle 100 and one of the key fobs has a negative status, the key fob wireless module 114 may send an alert to the other key fob and wait for a command (e.g., an unlock door command, etc.) from the other key fob. In such an example, upon receipt of the command, the key fob wireless module 114 may use the signal strength from that key fob to localize the operator.

In the illustrated example, the body control module 108 includes a localization manager 116. The localization manager 116 takes actions to provide information to the operator and/or provide some level of functionality of the RePA system when the status of the key fob 102 is negative. To mitigate the negative status of the key fob 102, the localization manager 116 (a) localizes the mobile device 104 instead of the key fob 102, (b) adjusts a boundary 118 of an operational zone 120, (c) limits use of the RePA system, and/or (d) instructs the mobile device 104 regarding limited functionality of the RePA system due to the negative status of the key fob, etc.

In some examples, the localization manager 116 tracks the location of the mobile device 104 instead of the key fob 102. The localization manager 116 communicatively couples to the mobile device 104 via the wireless module 106 and wireless nodes 112. In some examples, the localization manager 116 sends a message to the mobile device 104 to prompt the operator activating a particular wireless module (e.g., the BLE module, the WLAN module, etc.) of the mobile device 104. Alternatively, in some examples, the instructions cause an application executing on the mobile device 104 to activate the wireless module of the mobile device 104. In some examples, the instruction may be sent through one wireless module that is communicatively coupled to the mobile device 104 to activate another wireless module to use for localization. For example, when the wireless module 106 is communicatively coupled to the mobile device via the BLE module that uses a 2.4 GHz frequency band, the localization manager 116 may send a message to the mobile device 104 to activate the WLAN that uses the 5.0 GHz frequency band. In some examples, the mobile device 104 and the localization manager 116 are communicatively coupled to an external server. In such examples, the localization manager 116 sends a message via a cellular communication module to the external server which sends the message via a cellular data connection to the mobile device 104. After communicatively coupling with the mobile device 104 via the activated wireless module, the localization manager 116 localizes the mobile device 104.

In some examples, the localization manager 116 adjusts the boundary 118 of the operational zone 120 of the RePA system. In some examples, the localization manager 116 establishes a limited operational zone 122 defined by a limited boundary 124. The localization manager 116 determines the location of the limited boundary 124 based on error inherent in localizing the mobile device 104. For example, localization using the BLE module may have an error of ±2 meters. In such an example, if the RePA system initially establishes the boundary 118 of the operational zone 120 at 6 meters, the localization manager 116 may establish the limited boundary 124 to be at 4 meters from the vehicle 100. In some examples, localization manager 116 takes into account the shape of the vehicle 100, the antenna placement of the wireless nodes 112, other sources of error detected by range detections sensors (e.g., radar, LiDAR, ultrasonic sensors, cameras, etc.), etc. when establishing the limited boundary 124 of the limited operational zone 122. In the illustrated example, the limited boundary 124 is an elliptical shape, the localization manager 116 may establish the limited boundary 124 to be a regular or irregular shape based on anticipated error. Alternatively, in some examples, the localization manager 116 establishes limited operational zones 126 that are limited to areas proximate the wireless nodes 112.

In some examples, the localization manager 116 limits the operation of the RePA system. In some such examples, the localization manager 116 restricts the type of maneuvers that the RePA system can perform. For example, the localization manager 116 may limit the RePA system to only perform un-park maneuvers. In some examples, when the localization manager 116 limits the RePA system to performing un-park maneuvers, the localization manager 116 further limits the extent that the RePA system can autonomously move the vehicle 100. In some such examples, using measurements from range detection sensors, the localization manager 116 allows autonomous movement until the closed doors of the vehicle 100 are clear from obstructions that may prevent them from being fully opened.

In some examples, the localization manager 116 limits a number of consecutive parking events (e.g., autonomously parking the vehicle 100, autonomously un-parking the vehicle 100, etc.) in which the RePA system will engage. For example, the localization manager 116 may disable the RePA system after four parking events without the localization manager 116 receiving communication from the key fob 102. In some examples, the localization manager 116 disables the RePA system when the status of the key fob 102 is negative for a threshold duration (e.g., a day, two days, a week, etc.). For example, the localization manager 116 may disable the RePA system after the status of the key fob 102 is negative for a day. In some examples, the localization manager 116 disables the RePA system after the vehicle 100 has traveled more than a threshold distance. For example, the localization manager 116 may disable the RePA system after the vehicle travels 16 kilometers. In some examples, when the status of the key fob 102 is negative, the localization manager 116 disables the RePA system based on a location of the vehicle 100. In some such examples, the localization manager 116 enables the RePA system when the vehicle 100 is proximate locations associated with the operator, such as a home or an office, and disables the RePA system at other locations.

In some examples, the localization manager 116 sends information to the mobile device 104 to provide to the operator. In some such examples, the information includes the status of the key fob 102 and/or the level of charge of the battery of the key fob. In some such examples, the information includes a visual representation of the vehicle 100 and the location of the boundaries 118 and 124 and/or the operational zones 120, 122, and 126. In some such examples, the information includes a visual representation of the estimated location of the mobile device 104 in relation to the vehicle 100, the boundaries 118 and 124 and/or the operational zones 120, 122, and 126. In some examples, the information includes troubleshooting techniques for the operator to follow, such as (a) checking for presence of the key fob 102, (b) replacing the battery in key fob 102, (c) bringing the key fob 102 closer to vehicle 100 (e.g., to overcome electromagnetic interference, etc.) and/or (d) bringing the vehicle 100 and the key fob 102 to a dealer and/or a repair facility for service.

The autonomy unit 110 controls autonomous functions of the vehicle 100. More specifically, the autonomy unit 110 of the illustrated example includes a system to autonomously park and un-park a vehicle 100 when an operator is outside of the vehicle (sometime referred to as "remote parking," "vehicle remote park-assist," "remote park-assist," and "RePA"). For example, the RePA system of the autonomy unit 110 controls the motive functions of the vehicle upon initiation from the key fob 102 and/or the mobile device 104 to remotely park the vehicle into a parking spot. The RePA system of the autonomy unit 110 uses range detection sensors (e.g., ultrasonic sensors, radar, LiDAR, cameras, etc.) to sense the environment around a vehicle to detect a parking spot. When activated via the key fob 102 and/or mobile device 104 that is within an operational zone 120, 122 and 126 established by the localization manager 116, the RePA system of the autonomy unit 110 plans and executes a path into or out of the parking spot. In some examples, the RePA system is activated by the operator and scans for an available parking space. When a parking space is detected, the RePA system signals, via an interface (e.g., a center console display, etc.) for the operator to stop near the detected parking spot. The operator then exits the vehicle 100. The RePA system of the autonomy unit 110 is activated via the key fob 102 and/or mobile devices 104 to autonomously maneuver the vehicle 100 into the parking spot according to the planned path. When the key fob 102 and/or the mobile device 104 is outside of the operational zone 120, 122, and 126 established by the localization manager 116, the RePA system will not autonomously move the vehicle 100. Because the vehicle 100 is in motion during the remote parking maneuvers, the operational zone 120, 122, and 126 moves with the vehicle 100. As such, the key fob 102 and/or the mobile device 104 may, for example, transition to be outside of the boundary when the key fob 102 and/or mobile device 104 is stationary due to motion of the vehicle 100.

The autonomy unit 110 receives, from the localization manager 116, the status of the key fob 102, the boundary 118 and 124 of the operational zone 120, 122 and 126, the estimated location of the key fob 102 and/or the mobile device 104, and/or whether the RePA system is enabled or disabled. The boundary 118 and 124 of the operational zone 120, 122 and 126 is defined relative to the surface of the vehicle 100 so that as the vehicle 100 moves, the operational zone 120, 122 and 126 moves. When the limited boundary 124 is defining the limited operational zone 122 and takes into account sources of localization error around the vehicle 100, the contours of the limited operational zone 122 may change as the vehicle 100 moves. When the RePA system is disabled by the localization manager 116, the RePA system does not autonomously move the vehicle 100.

Figure 2:
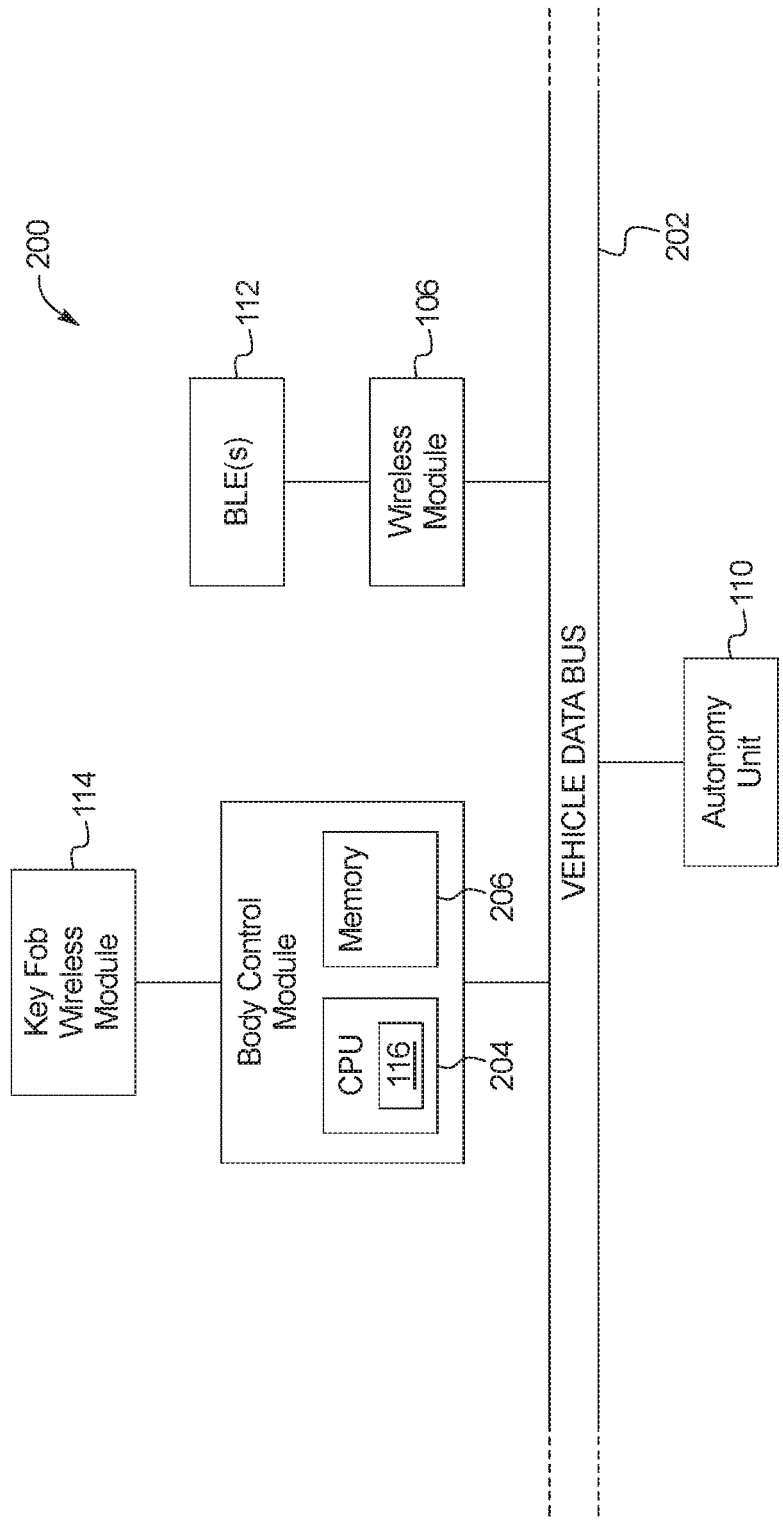
FIG. 2 is a block diagram of electronic components of the vehicle of FIG. 1.

FIG. 2 is a block diagram of electronic components 200 of the vehicle 100 of FIG. 1. In the illustrated examples, the electronic components 200 includes the wireless module 106, the body control module 108, the autonomy unit 110, the wireless nodes 112, the key fob wireless module 114, and a vehicle data bus 202.

The body control module 108 includes a processor or controller 204 and memory 206. In the illustrated example, the body control module 108 is structured to include localization manager 116. Alternatively, in some examples, the localization manager 116 may be incorporated into another electronic control unit (ECU) with its own processor and memory, such as the autonomy unit 110. The processor or controller 204 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 206 includes multiple kinds of memory, particularly volatile memory and non-volatile memory.

The memory 206 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 206, the computer readable medium, and/or within the processor 204 during execution of the instructions.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

The vehicle data bus 202 communicatively couples the wireless module 106, body control module 108, and the autonomy unit 110. In some examples, the vehicle data bus 202 includes one or more data buses. The vehicle data bus 202 may be implemented in accordance with a controller area network (CAN) bus protocol as defined by International Standards Organization (ISO) 11898-1, a Media Oriented Systems Transport (MOST) bus protocol, a CAN flexible data (CAN-FD) bus protocol (ISO 11898-7) and/a K-line bus protocol (ISO 9141 and ISO 14230-1), and/or an Ethernet™ bus protocol IEEE 802.3 (2002 onwards), etc.

Figure 3:
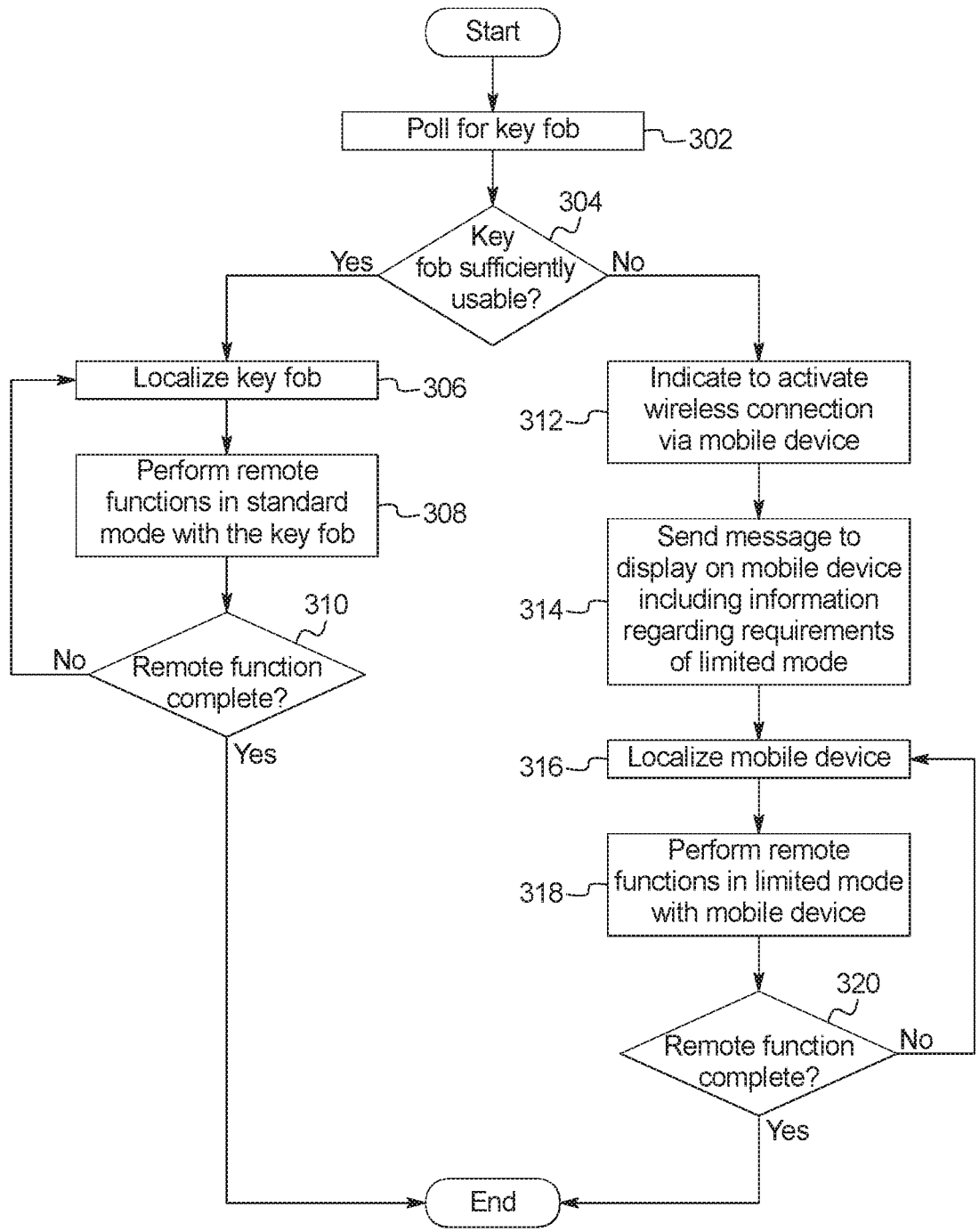
FIG. 3 is a flowchart of a method to mitigate key fob error, which may be implemented by the electronic components of FIG. 2.

FIG. 3 is a flowchart of a method to mitigate key fob error, which may be implemented by the electronic components 200 of FIG. 2. At block 302, the localization manager 116 polls for the key fob 102. At block 304, the localization manager 116 determines whether the key fob 102 is sufficiently usable or present. The key fob is sufficiently usable when (a) the localization manager 116 receives a response to the polling signal from the key fob 102 (b) the voltage of the battery of the key fob 102 is above a threshold value (e.g., 2.7 volts, etc.), or (c) the percentage of the polling signals that receive a response the key fob 102 is greater than a threshold percentage. When the key fob 102 is sufficiently usable, the method continues to block 306. Otherwise, when the key fob 102 is not sufficiently usable (e.g., the status of the key fob 102 is negative), the method continues at block 312.

At block 306, the localization manager 116 localizes the position of the key fob 102 based on signal strength indication in the communication from the key fob 102 or a time-of-flight measurement. At block 308, the localization manager 116 enables the RePA system to act based on whether the key fob 102 is within the operational zone 120. At block 310, the localization manager 116 determines whether the operation (e.g., the autonomous parking of the vehicle 100) is complete. When the operation is complete, the method ends. When the operation is not complete, the method returns to block 306.

At block 312, the localization manager 116 indicates to the operator to activate one of the wireless modules of the mobile device 104. In some examples, the localization manager 116 sends a message, directly or indirectly, to either (a) request that the operator enable the wireless module or (b) cause the mobile device 104 to enable the wireless module. Alternatively or additionally, in some examples, the localization manager 116 provides, via lights of the vehicle 100 or external sound generating devices (e.g., speakers, a horn, etc.) of the vehicle 100, an audio and/or visual alert to the operator. At block 314, the localization manager 116 sends a message to the mobile device 104 to provide information to the operator regarding limitations imposed on the RePA system, such as the limited operational zone 122 and 126 and/or the time/place/mileage/number of use restrictions on the RePA system. At block 316, the localization manager 116 determines the location of the operator by localizing the mobile device 104. At block 318, the localization manager 116 enables the RePA system to act in a limited mode. For example, the RePA system may operate based on whether the mobile device 104 is within the limited operational zone 122 and 126. At block 320, the localization manager 116 determines whether the operation (e.g., the autonomous parking of the vehicle 100) is complete. When the operation is complete, the method ends. When the operation is not complete, the method returns to block 316.

The flowchart of FIG. 3 is representative of machine readable instructions stored in memory (such as the memory 206 of FIG. 2) that comprise one or more programs that, when executed by a processor (such as the processor 204 of FIG. 2), cause the vehicle 100 to implement the example localization manager 116 of FIGS. 1 and 2. Further, although the example program(s) is/are described with reference to the flowchart illustrated in FIG. 3, many other methods of implementing the example localization manager 116 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
    a wireless module configured to communicatively couple to at least one of: a key fob and a mobile device; and
    a processor configured to:
        estimate a location of an operator relative to the vehicle based on a signal received from the key fob;
        operate an autonomous parking system of the vehicle in a first mode using the key fob based on a determination that the key fob is within a first operational zone of a first size;
        determine, during operation of an autonomous parking system in the first mode, that the key fob is not usable to estimate the location of the operator relative to the vehicle;
        establish a second operational zone in which the operator must remain for the autonomous parking system to be enabled to autonomously move the vehicle in a second mode, the second operational zone having a second size smaller than the first size;
        estimate the location of the operator in the second mode using the mobile device and without using the key fob; and
        operate, based on a determination that that the operator is within the second operational zone of the vehicle, the autonomous parking system of the vehicle.

2. The vehicle of claim 1, wherein the processor is further configured to send, based on the determination that the key fob is not usable, information regarding the second mode to the mobile device.

3. The vehicle of claim 2, wherein the information regarding the second mode includes a visual representation displayed on the mobile device of an operational zone being used when the autonomous parking system is being operated in the second mode.

4. The vehicle of claim 1, wherein the processor is further configured to determine the second size based on the first size and an estimated localization error of localizing the mobile device, wherein the estimated localization error includes error caused by a frequency at which the mobile device is being localized.

5. The vehicle of claim 4, wherein the processor is further configured to engage, based on the determination that the key fob is not usable, a limited operation mode, wherein the limited operation mode involves at least one of: limiting a number of consecutive parking events performed by a remote parking application of the mobile device, limiting a duration in which the mobile device is usable, limiting a time of day or day of a week in which the mobile device is usable, prevent a use of the mobile device after a threshold distance has been traveled by the vehicle, and limiting the use of the mobile device based on location.

6. The vehicle of claim 1, wherein the second operational zone includes a plurality of zones.

7. The vehicle of claim 1, wherein the processor is further configured to determine whether the key fob is usable based on battery information received from the key fob.

8. The vehicle of claim 1, wherein the processor is further configured to determine whether the key fob is usable based on not receiving responses from the key fob after broadcasting a polling signal.

9. The vehicle of claim 1, where the processor is further configured to, in response to determining that the key fob is not usable, send an instruction to the mobile device to activate a wireless module of the mobile device.

10. A method comprising:
estimating, via a processor of a vehicle, a location of an operator relative to the vehicle based on a signal received from a key fob, and
operating, with the processor and based on a determination that the key fob is within a first operational zone of a first size, an autonomous parking system of the vehicle in a first mode;
determining, via the processor, that the key fob associated with the operator is not usable to estimate the location of the operator relative to the vehicle;
establishing a second operational zone in which the operator must remain for the autonomous parking system to be enabled to autonomously move the vehicle in a second mode, the second operational zone having a second size smaller than the first size;
estimating, via the processor, the location of the operator relative to the vehicle based on a signal received from a mobile device, and without using the key fob; and
operating, based on a determination that that the operator is within the second operational zone of the vehicle, the autonomous parking system of the vehicle.

11. The method of claim 10, further comprising sending, based on the determination that the key fob is not usable, information regarding the second mode to the mobile device.

12. The method of claim 11, wherein the information regarding the second mode includes a visual representation displayed on the mobile device of an operational zone being used when the autonomous parking system is being operated in the second mode.

13. The method of claim 10, further comprising determining the second size based on the first size and an estimated localization error of localizing the mobile device, the estimated localization error including error caused by a frequency at which the mobile device is being localized.

14. The method of claim 10, further comprising engaging, based on the determination that the key fob is not usable, a limited operation mode, wherein the limited operation mode involves at least one of: limiting a number of consecutive parking events performed by a remote parking application of the mobile device, limiting a duration in which the mobile device is usable, limiting a time of day or day of a week in which the mobile device is usable, and prevent a use of the mobile device after a threshold distance has been traveled by the vehicle.

15. The method of claim 10, further comprising determining that the key fob is not usable based on at least one of battery information received from the key fob or not receiving responses from the key fob after broadcasting a polling signal.

16. The method of claim 10, further comprising, in response to determining that the key fob is not usable, sending an instruction to the mobile device to activate a wireless module of the mobile device.

* * * * *